July 19, 1949.    J. INCHIOSTRO    2,476,415
FISHING PLUG
Filed April 5, 1947
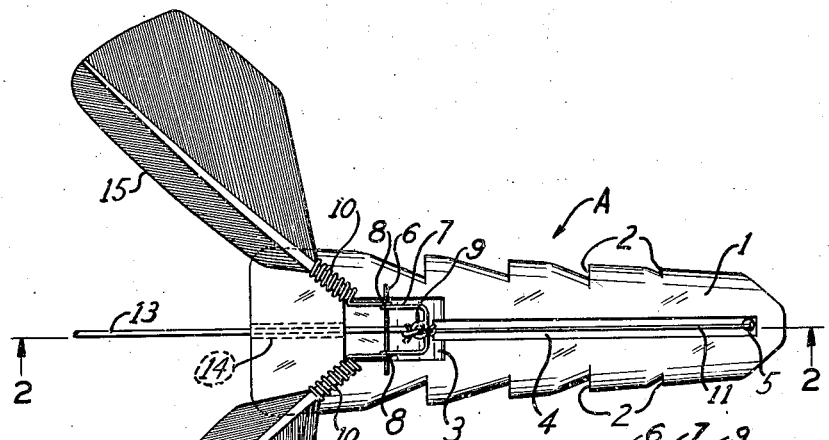
FIG. 1.
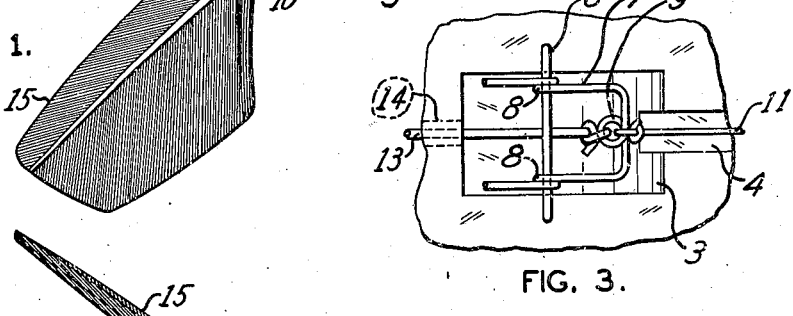
FIG. 3.
FIG. 2.
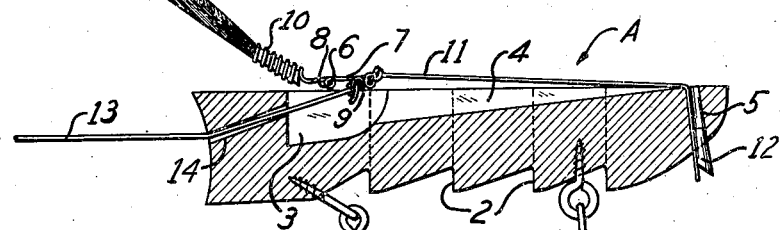
FIG. 4.
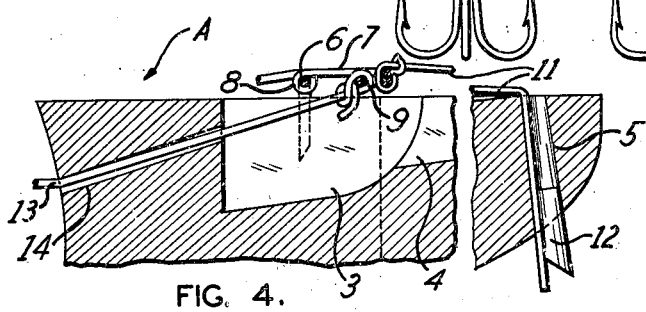
INVENTOR
JOHN INCHIOSTRO
BY
ATTORNEY Patented July 19, 1949

2,476,415

UNITED STATES PATENT OFFICE 2,476,415

FISHING PLUG

John Inchiostro, Normandy, Mo.

Application April 5, 1947, Serial No. 739,670

5 Claims. (Cl. 43—42.02)

This invention relates generally to artificial fishing bait and more specifically to fishing plugs of the type adapted for use at the surface of water, the predominant object of the invention being to provide an improved fishing plug of this type which is so constructed and arranged that when said plug is jerked along the surface of the water, parts of the plug will be subjected to movement which simulates the flapping of wings of insects, so as to cause fish to be attracted to the plug.

Fig. 1 is a plan view of the improved fishing plug of the present invention.

Fig. 2 is a longitudinal section taken on line 2—2 of Fig. 1.

Fig. 3 is an enlarged, fragmentary plan view of a portion of the improved fishing plug illustrated by Figs. 1 and 2.

Fig. 4 is an enlarged, fragmentary longitudinal section of the improved fishing plug which, because of its larger scale illustrates to better advantage certain operating parts of the fishing plug.

In the drawing, wherein is shown for purposes of illustration, merely, one embodiment of the invention, A designates the improved fishing plug generally. The plug A comprises a body portion 1 which may be formed of wood, or other suitable buoyant material, said body portion being so shaped as to be provided at the sides and bottom thereof with a plurality of shoulders 2 which serve a purpose to be hereinafter set forth. The body portion 1 is provided with a cavity 3 which is open at the top face thereof and is located at a point adjacent to the rear end of said body portion. Also, the body portion 1 of the fishing plug A is provided in its top face with a channelway 4 of tapered depth, said channelway communicating with the cavity 3 at the end thereof which is of greater depth and said channelway terminating at its opposite end at a slightly tapered opening 5 which is formed through the forward portion of the body portion of the fishing plug.

The body portion 1 of the fishing plug A is provided with an element 6 which is in the general form of a staple, said element comprising spaced, vertical portions which are driven into the material of the body portion 1 beyond opposite sides of the cavity 3, and a bridge portion which joins said spaced, vertical portions and spans said cavity 3 (see Figs. 3 and 4). The bridge portion of the element 6 serves as means for supporting for movement a member 7, said member being formed from a length of wire which has spaced eyes 8 turned in opposed portions thereof through which the bridge portion of the element 6 extends, whereby said member is supported by said bridge portion of said element 6 for rotary movement with respect thereto. The member 7 includes opposed portions which extend forwardly from the eyes 8, and at their forward ends these opposed portions are joined by a transversely extended portion which has an eye 9 formed therein at the approximate longitudinal center of said transversely extended portion. Also, the member 7 includes opposed portions which extend rearwardly from the spaced eyes 8, and said rearwardly extended portions merge into divergent coiled portions 10 which form parts of the member 7.

Attached to the eye 9 of the member 7 is a length 11 of resilient material, rubber, for instance, said length of resilient material being extended forwardly of the body portion of the plug under tension to the opening 5 wherein an end portion of said length of resilient material is anchored by a plug 12 which is driven into said opening 5. Attached also to the eye 9 of the member 7 is a fishing line 13, whose opposite end portion may be suitably attached to a fishing pole (not shown), a portion of said fishing line being extended through an opening 14 which is formed through the rear portion of the body portion 1 of the fishing plug A. The coiled portions 10 of the member 7 receive and frictionally grip end portions of elements 15 which resemble, somewhat, the wings of insects, it having been found that feathers serve very well in this capacity. The body portion 1 of the fishing plug A has fixed thereto so as to be suspended therefrom a plurality of fish hooks 16.

In the use of the fishing plug of the present invention the fishing line 13 is subjected by the fisherman to sharp jerks, the shoulders 2 of the body portion of the fishing plug contacting with the water in such manner as to resist free movement of the fishing plug along the water in response to said sharp jerks on the fishing line. As a result of this situation the member 7 will rotate about the bridge portion of the element 6 in response to each jerk on the fishing line, so as to cause the wing-like elements 15 to be swung forwardly in an arc of a circle, the length of resilient material 11 restoring the member 7 and the elements 15 to their original rearward positions when the jerking force ceases. Such forward and rearward movement of the elements 15 simulates flapping of the wings of an insect and as a result thereof fish are attracted to the bait and are induced to strike at the bait.

I claim:
1. A fishing plug comprising a body portion, a supporting element associated with said body portion, a member supported by said supporting element for rotary movement, wing-like elements attached to said member and movable therewith, a fishing line attached to said member and adapted to be jerked to subject said member and said wing-like elements to movement, and means comprising a length of resilient material which is attached to said member and is anchored to said body portion for restoring said member and said wing-like elements to their original positions when the jerking force which moves them has ceased, said member being formed from a length of wire and having eyes formed therein which embrace said supporting element, and having a portion to which said fishing line and said length of resilient material are attached.

2. A fishing plug comprising a body portion, a supporting element associated with said body portion, a member supported by said supporting element for rotary movement, wing-like elements attached to said member and movable therewith, a fishing line attached to said member and adapted to be jerked to subject said member and said wing-like elements to movement, and means comprising a length of resilient material which is attached at one of its ends to said member and is anchored at its opposite end to said body portion for restoring said member and said wing-like elements to their original positions when the jerking force which moves them has ceased, said member being formed from a length of wire and comprising laterally spaced portions having eyes formed therein which embrace a portion of said supporting element, and a transversely extended portion at an end of said member which joins said laterally spaced portions and to which said fishing line and said length of resilient material are attached.

3. A fishing plug comprising a body portion, a supporting element associated with said body portion, a member supported by said supporting element for rotary movement, wing-like elements attached to said member and movable therewith, a fishing line attached to said member and adapted to be jerked to subject said member and said wing-like elements to movement, and means comprising a length of resilient material which is attached at one of its ends to said member and is anchored at its opposite end to said body portion for restoring said member and said wing-like elements to their original positions when the jerking force which moves them has ceased, said member being formed from a length of wire and comprising laterally spaced portions having eyes formed therein which embrace a portion of said supporting element, a transversely extended portion at an end of said member which joins said laterally spaced portions and to which said fishing line and said length of resilient material are attached, and coiled portions at the opposite end of said member which receive and grip portions of said wing-like elements.

4. A fishing plug comprising a body portion, a supporting element associated with said body portion, a member supported by said supporting element for rotary movement, wing-like elements attached to said member and movable therewith, a fishing line attached to said member and adapted to be jerked to subject said member and said wing-like elements to movement, and means comprising a length of resilient material which is attached at one of its ends to said member and is anchored at its opposite end to said body portion for restoring said member and said wing-like elements to their original positions when the jerking force which moves them has ceased, said member being formed from a length of wire and comprising laterally spaced portions having eyes formed therein which embrace a portion of said supporting element, a transversely extended portion at an end of said member which joins said laterally spaced portions and has an eye formed therein to which said fishing line and said length of resilient material are attached, and coiled portions at the opposite end of said member which receive and grip portions of said wing-like elements.

5. A fishing plug comprising a body portion, a supporting element associated with said body portion, a member supported by said supporting element for rotary movement, wing-like elements attached to said member and movable therewith, a fishing line attached to said member and adapted to be jerked to subject said member and said wing-like elements to movement, and means comprising a length of resilient material which is attached at one of its ends to said member and is anchored at its opposite end to said body portion for restoring said member and said wing-like elements to their original positions when the jerking force which moves them has ceased, said member being formed from a length of wire and comprising laterally spaced portions having eyes formed therein which embrace a portion of said supporting element, a transversely extended portion at an end of said member which joins said laterally spaced portions and has an eye formed therein to which said fishing line and said length of resilient material are attached, and divergent coiled portions at the opposite end of said member which receive and grip portions of said wing-like elements.

JOHN INCHIOSTRO.

REFERENCES CITED

The following references are of record in the file of this patent:

UNITED STATES PATENTS

| Number | Name | Date |
| --- | --- | --- |
| 378,410 | Trimble | Feb. 21, 1888 |
| 1,857,312 | Kuehn | May 10, 1932 |
| 1,923,623 | Hoage | Aug. 22, 1933 |